(12) United States Patent
Galante et al.

(10) Patent No.: US 7,552,596 B2
(45) Date of Patent: Jun. 30, 2009

(54) DUAL THERMOCHROMIC LIQUID CRYSTAL TEMPERATURE SENSING FOR REFRIGERANT CHARGE INDICATION

(75) Inventors: Timothy P. Galante, West Hartford, CT (US); Sivakumar Gopalnarayanan, Simsbury, CT (US); Don Alan Schuster, Lindale, TX (US); Craig R. Kersten, Mooresville, IN (US); Larry Burns, Avon, IN (US)

(73) Assignee: Carrier Corporation, Farmington, CT (US)

( * ) Notice: Subject to any disclaimer, the term of this patent is extended or adjusted under 35 U.S.C. 154(b) by 637 days.

(21) Appl. No.: 11/025,352

(22) Filed: Dec. 27, 2004

(65) Prior Publication Data

US 2006/0137367 A1 Jun. 29, 2006

(51) Int. Cl.
*F25B 49/00* (2006.01)
*F25B 45/00* (2006.01)
(52) U.S. Cl. .............................. 62/127; 62/129; 62/149
(58) Field of Classification Search .................. 62/125, 62/126, 127, 129, 130, 145, 168, 183, 149; 165/11.1, 11.2; 236/51, 94; 374/41, 116, 374/141
See application file for complete search history.

(56) References Cited

U.S. PATENT DOCUMENTS

| | | | |
|---|---|---|---|
| 4,114,448 A | | 9/1978 | Merritt |
| 4,304,126 A | * | 12/1981 | Yelke .......................... 73/119 A |
| 4,325,223 A | * | 4/1982 | Cantley .......................... 62/126 |
| 4,381,549 A | | 4/1983 | Stamp, Jr. et al. |
| 4,429,578 A | | 2/1984 | Darrel et al. |
| 4,510,576 A | | 4/1985 | MacArthur et al. |
| 4,541,284 A | * | 9/1985 | Guagliumi et al. ............ 73/730 |
| 4,561,261 A | | 12/1985 | Kornrumpf et al. |
| 4,624,112 A | * | 11/1986 | Proctor .......................... 62/149 |
| 4,745,519 A | * | 5/1988 | Breidegam ................... 361/220 |

(Continued)

FOREIGN PATENT DOCUMENTS

EP 0 159 281 5/1990

(Continued)

OTHER PUBLICATIONS http://www.uview.com/homepage.html The UVIEW Tempscan A/C diagnostic device model #580000 (1 pg.).

(Continued)

*Primary Examiner*—Marc E Norman
(74) *Attorney, Agent, or Firm*—Marjama Muldoon Blasiak & Sullivan LLP

(57) ABSTRACT

The sufficiency of refrigerant charge in an air conditioning system is determined by a comparison of two sensed temperatures in the system, one being the liquid line temperature and the other being either the outdoor temperature or the condenser coil temperature. In one embodiment the two sensed temperatures are displayed on respective thermochromic strips which are so calibrated and juxtaposed as to provide a visual indication, by the relative positions of the two displayed sensed temperatures, as to whether the refrigerant charge is adequate. In another embodiment, the sensed liquid line temperature is displayed by way of a plurality of LEDs and the other temperature is displayed by way of a marker on a temperature scale. If the two displayed temperatures are aligned, then the refrigerant charge is optimized, and if they are not aligned, the system is undercharged or overcharged.

12 Claims, 4 Drawing Sheets

U.S. PATENT DOCUMENTS

| | | | |
|---|---|---|---|
| 4,798,055 A * | 1/1989 | Murray et al. | 62/127 |
| 4,805,416 A * | 2/1989 | Manz et al. | 62/292 |
| 4,841,734 A | 6/1989 | Torrence | |
| 4,856,288 A * | 8/1989 | Weber | 62/129 |
| 4,982,576 A * | 1/1991 | Proctor et al. | 62/292 |
| 5,016,472 A * | 5/1991 | Amrhein et al. | 73/335.08 |
| 5,046,322 A | 9/1991 | Bulla et al. | 62/126 |
| 5,057,965 A * | 10/1991 | Wilson | 361/212 |
| 5,079,930 A | 1/1992 | Beaverson et al. | |
| 5,156,012 A | 10/1992 | Kuribara et al. | |
| 5,186,012 A * | 2/1993 | Czachorski et al. | 62/114 |
| 5,206,963 A | 5/1993 | Wiens | |
| 5,214,918 A | 6/1993 | Oguni et al. | |
| 5,228,304 A | 7/1993 | Ryan | |
| H1226 H | 9/1993 | VanReene et al. | |
| 5,241,833 A | 9/1993 | Ohkoshi | |
| 5,248,168 A | 9/1993 | Chichester et al. | |
| 5,251,453 A | 10/1993 | Stanke et al. | |
| 5,295,360 A | 3/1994 | Olds et al. | |
| 5,317,903 A | 6/1994 | McClelland et al. | |
| 5,341,649 A | 8/1994 | Nevitt et al. | |
| 5,354,103 A | 10/1994 | Torrence et al. | |
| 5,362,530 A | 11/1994 | Kitami et al. | |
| 5,374,084 A | 12/1994 | Potokar | |
| 5,381,669 A | 1/1995 | Bahel et al. | |
| 5,406,980 A | 4/1995 | Allread et al. | |
| 5,413,147 A | 5/1995 | Moreiras et al. | |
| 5,423,189 A | 6/1995 | Nicol et al. | |
| 5,425,558 A | 6/1995 | Dennany, Jr. | |
| 5,430,692 A * | 7/1995 | Grupp et al. | 368/11 |
| 5,463,377 A | 10/1995 | Kronberg | |
| 5,464,042 A | 11/1995 | Haunhorst | |
| 5,468,028 A | 11/1995 | Olson | |
| 5,474,336 A | 12/1995 | Hoff et al. | |
| 5,540,463 A | 7/1996 | Potokar | |
| 5,694,778 A * | 12/1997 | Wilson | 62/77 |
| 5,752,726 A | 5/1998 | Fixemer | |
| 5,807,332 A * | 9/1998 | Augustine et al. | 604/113 |
| 5,834,943 A | 11/1998 | Miller | |
| 5,868,437 A | 2/1999 | Teague | |
| 5,961,157 A | 10/1999 | Baron et al. | |
| 6,012,743 A | 1/2000 | Godeau et al. | |
| 6,045,742 A * | 4/2000 | McGrevy | 264/328.15 |
| 6,155,612 A | 12/2000 | Szabo | |
| 6,179,214 B1 * | 1/2001 | Key et al. | 236/51 |
| 6,302,654 B1 | 10/2001 | Millet et al. | |
| 6,308,523 B1 | 10/2001 | Scaringe | |
| 6,324,854 B1 | 12/2001 | Jayanth | |
| 6,330,802 B1 | 12/2001 | Cummings et al. | |
| 6,354,332 B1 | 3/2002 | Burkhardt et al. | |
| 6,382,678 B1 | 5/2002 | Field et al. | |
| 6,436,053 B1 * | 8/2002 | Knapp et al. | 600/538 |
| 6,442,953 B1 | 9/2002 | Trigiani et al. | |
| 6,460,354 B2 | 10/2002 | Yabuki et al. | |
| 6,470,695 B2 * | 10/2002 | Gong | 62/129 |
| 6,481,756 B1 | 11/2002 | Field et al. | |
| 6,497,435 B1 | 12/2002 | Luft et al. | |
| 6,546,823 B1 * | 4/2003 | Veit | 73/866.5 |
| 6,550,341 B2 * | 4/2003 | van Schoor et al. | 73/775 |
| 6,553,774 B1 | 4/2003 | Ishio et al. | |
| 6,571,566 B1 * | 6/2003 | Temple et al. | 62/129 |
| 6,594,554 B1 | 7/2003 | Seem et al. | |
| 6,658,373 B2 * | 12/2003 | Rossi et al. | 702/185 |
| 6,758,051 B2 | 7/2004 | Jayanth et al. | |
| 6,769,258 B2 * | 8/2004 | Pierson | 60/772 |
| 6,868,678 B2 | 3/2005 | Mei et al. | |
| 7,079,967 B2 * | 7/2006 | Rossi et al. | 702/83 |
| 2002/0024218 A1 | 2/2002 | Manuli | |
| 2002/0096209 A1 | 7/2002 | Danielson et al. | |
| 2002/0121100 A1 | 9/2002 | Yabuki et al. | |
| 2002/0139128 A1 * | 10/2002 | Suzuki et al. | 62/129 |
| 2002/0141877 A1 | 10/2002 | Jayanth et al. | |
| 2002/0182005 A1 | 12/2002 | Milhas | |
| 2003/0089119 A1 | 5/2003 | Pham et al. | |
| 2003/0158704 A1 * | 8/2003 | Triginai et al. | 702/182 |
| 2003/0172665 A1 | 9/2003 | Matsuoka et al. | |
| 2003/0182950 A1 * | 10/2003 | Mei et al. | 62/129 |
| 2003/0226367 A1 | 12/2003 | Palmer et al. | |
| 2005/0235755 A1 * | 10/2005 | Hindman | 73/756 |

FOREIGN PATENT DOCUMENTS

| | | |
|---|---|---|
| EP | 0 308 160 | 6/1991 |
| EP | 0 453 302 | 10/1991 |
| EP | 0 289 369 | 1/1992 |
| EP | 0 396 029 | 9/1992 |
| EP | 0 550 263 | 7/1993 |
| EP | 0 409 000 | 2/1994 |
| EP | 0 529 758 | 6/1996 |
| EP | 0 760 069 | 3/1997 |
| EP | 0 843 794 | 5/1998 |
| EP | 0 918 182 | 5/1999 |
| EP | 1 238 838 | 9/2002 |
| EP | 1 337 825 | 8/2003 |
| FR | 2667570 A1 * | 4/1992 |
| GB | 2 274 695 | 8/1994 |
| JP | 62-218748 | 9/1987 |
| JP | 62-261845 | 11/1987 |
| JP | 63-302238 | 12/1988 |
| JP | 2-110268 | 4/1990 |
| JP | 2-195165 | 8/1990 |
| JP | 4-55671 | 2/1992 |
| JP | 4-190062 | 7/1992 |
| JP | 4-273941 | 9/1992 |
| JP | 5-99475 | 4/1993 |
| JP | 5-231754 | 9/1993 |
| JP | 5-256543 | 10/1993 |
| JP | 7-55299 | 3/1995 |
| JP | 8-68576 | 3/1996 |
| JP | 8-261542 | 10/1996 |
| JP | 8-261543 | 10/1996 |
| JP | 2000-9048 | 1/2000 |
| JP | 2000-154954 | 6/2000 |
| JP | 2001-32884 | 2/2001 |
| JP | 2001-141279 | 5/2001 |
| WO | WO 93/20376 | 10/1993 |
| WO | WO 95/30106 | 11/1995 |
| WO | WO 95/30107 | 11/1995 |
| WO | WO 95/33157 | 12/1995 |
| WO | WO 96/17202 | 6/1996 |
| WO | WO 97/12167 | 4/1997 |
| WO | WO 97/13994 | 4/1997 |
| WO | WO 97/13995 | 4/1997 |
| WO | WO 97/47908 | 12/1997 |
| WO | WO 00/45053 | 8/2000 |
| WO | WO 01/23794 | 4/2001 |

OTHER PUBLICATIONS http://findarticles.com/p/articles/mi_qa3828/is_200209/ai_n9119405/pg_8 This reference to Tempscan device is dated in 2002 (10 pgs.).

* cited by examiner

DUAL THERMOCHROMIC LIQUID CRYSTAL TEMPERATURE SENSING FOR REFRIGERANT CHARGE INDICATION

BACKGROUND OF THE INVENTION

This application is related to the following applications filed concurrently herewith and assigned to the assignee of the present invention: Ser. Nos. 11/025,351; 11/025,353; 11/025,787; 11/025,788 and 11/025,836

Maintaining proper refrigerant charge level is essential to the safe and efficient operation of an air conditioning system. Improper charge level, either in deficit or in excess, can cause premature compressor failure. An over-charge in the system results in compressor flooding, which, in turn, may be damaging to the motor and mechanical components. Inadequate refrigerant charge can lead to increased power consumption, thus reducing system capacity and efficiency. Low charge also causes an increase in refrigerant temperature entering the compressor, which may cause thermal over-load of the compressor. Thermal over-load of the compressor can cause degradation of the motor winding insulation, thereby bringing about premature motor failure.

Charge adequacy has traditionally been checked using either the "superheat method" or "subcool method". For air conditioning systems which use a thermal expansion valve (TXV), or an electronic expansion valve (EXV), the superheat of the refrigerant entering the compressor is normally regulated at a fixed value, while the amount of subcooling of the refrigerant exiting the condenser varies. Consequently, the amount of subcooling is used as an indicator for charge level. Manufacturers often specify a range of subcool values for a properly charged air conditioner. For example, a subcool temperature range between 10 and 15° F. is generally regarded as acceptable in residential cooling equipment. For air conditioning systems that use fixed orifice expansion devices instead of TXVs (or EXVs), the performance of the air conditioner is much more sensitive to refrigerant charge level. Therefore, superheat is often used as an indicator for charge in these types of systems. A manual procedure specified by the manufacturer is used to help the installer to determine the actual charge based on either the superheat or subcooling measurement. Table 1 summarizes the measurements required for assessing the proper amount of refrigerant charge.

TABLE 1

Measurements Required for Charge Level Determination

| | Superheat method | Subcooling method |
|---|---|---|
| 1 | Compressor suction temperature | Liquid line temperature at the inlet to expansion device |
| 2 | Compressor suction pressure | Condenser outlet pressure |
| 3 | Outdoor condenser coil entering air temperature | |
| 4 | Indoor returning wet bulb temperature | |

To facilitate the superheat method, the manufacturer provides a table containing the superheat values corresponding to different combinations of indoor return air wet bulb temperatures and outdoor dry bulb temperatures for a properly charged system. This charging procedure is an empirical technique by which the installer determines the charge level by trial-and-error. The field technician has to look up in a table to see if the measured superheat falls in the correct ranges specified in the table. Often the procedure has to be repeated several times to ensure the superheat stays in a correct range specified in the table. Consequently this is a tedious test procedure, and difficult to apply to air conditioners of different makers, or even for equipment of the same maker where different duct and piping configurations are used. In addition, the calculation of superheat or subcool requires the measurement of compressor suction pressure, which requires intrusive penetration of pipes.

In the subcooling method, as with the superheat method, the manufacturer provides a table listing the liquid line temperature required as a function of the amount of subcooling and the liquid line pressure. Once again, the field technician has to look up in the table provided to see if the measured liquid line temperature falls within the correct ranges specified in the table. Thus, this charging procedure is also an empirical, time-consuming, and a trial-and-error process.

SUMMARY OF THE INVENTION

Briefly, in accordance with one aspect of the invention, a simple and inexpensive refrigerant charge inventory indication method is provided using temperature measurements only.

By another aspect of the invention, temperature sensors are used to sense the liquid line temperature and a related temperature, the difference of which provides an indication of refrigerant charge adequacy in air conditioning systems, with the results being shown across a range of a visible spectrum. The sensed temperature indicators from the respective sensors are adjacently disposed such that aligned indicators are indicative of the optimal refrigerant charge and non-aligned indicators are indicative of an under-charged or over-charged condition.

In accordance with another aspect of the invention, an indication of the sufficiency of the refrigerant charge in the system is obtained by sensing both the condenser outlet liquid line temperature and the outdoor temperature and observing the difference between the two, which is the condenser approach temperature difference $T_{CATD}$, as an indication of charge adequacy.

By another aspect of the invention, the $T_{CATD}$ is compared with a predetermined optimal condenser approach temperature difference to determine the sufficiency of the charge in the system.

By another aspect of the invention, an indication of the sufficiency of the refrigerant charge in the system is obtained by sensing both the condenser outlet liquid line temperature and the condenser coil temperature and observing the difference between the two, which is the coil temperature difference $T_{CTD}$, as an indication of charge adequacy.

In accordance with yet another aspect of the invention, the respective sensed temperature indicators are thermochromatic liquid crystal temperature strips with individual display crystals acting to reflect light from a particular crystal representative of the sensed temperature.

By still another aspect of the invention, the sensed temperature indicators include a plurality of LEDs representative of a spectrum of sensed temperatures.

In the drawings as hereinafter described, a preferred embodiment is depicted; however, various other modifications and alternate constructions can be made thereto without departing from the true spirit and scope of the invention.

DESCRIPTION OF THE PREFERRED EMBODIMENT

Figure 1:
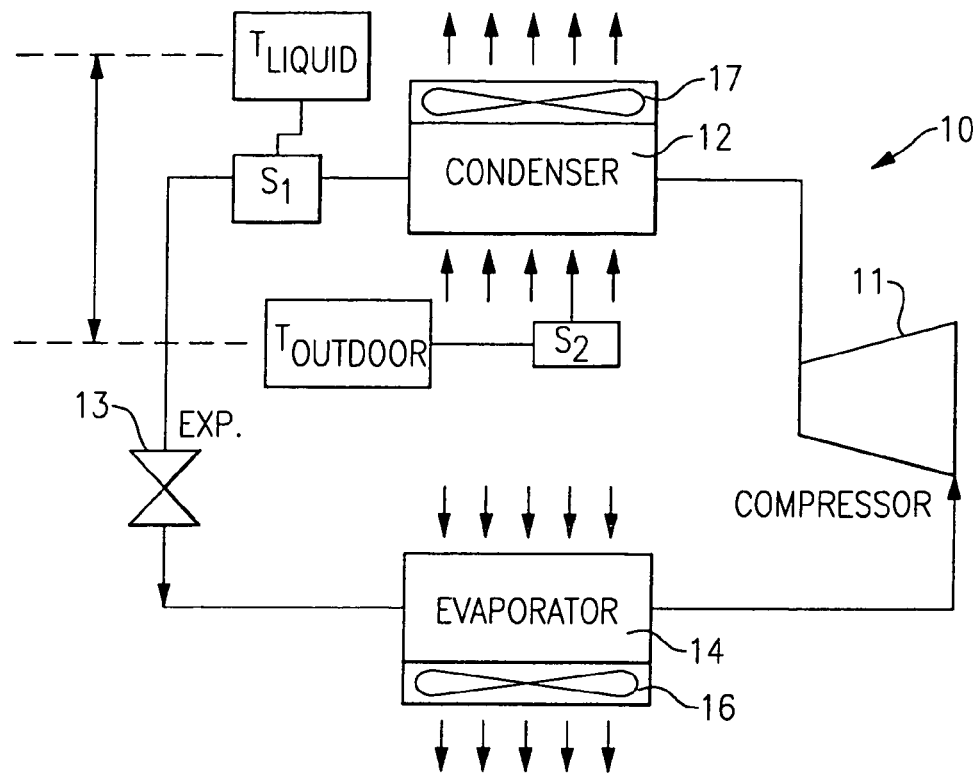
FIG. 1 is a schematic illustration of an air conditioning system with the present invention incorporated therein.

Referring now to FIG. 1, the invention is shown generally at 10 as incorporated into an air conditioning system having a compressor 11, a condenser 12, an expansion device 13 and an evaporator 14. In this regard, it should be recognized that the present invention is equally applicable for use with heat pump systems.

In operation, the refrigerant flowing through the evaporator 14 absorbs the heat in the indoor air being passed over the evaporator coil by the evaporator fan 16, with the cooled air then being circulated back into the indoor air to be cooled. After evaporation, the refrigerant vapor is pressurized in the compressor 11 and the resulting high pressure vapor is condensed into liquid refrigerant at the condenser 12, which rejects the heat in the refrigerant to the outdoor air being circulated over the condenser coil 12 by way of the condenser fan 17. The condensed refrigerant is then expanded by way of an expansion device 13, after which the saturated refrigerant liquid enters the evaporator 14 to continue the cooling process.

In a heat pump, during cooling mode, the process is identical to that as described hereinabove. In the heating mode, the cycle is reversed with the condenser and evaporator of the cooling mode acting as an evaporator and condenser, respectively.

It should be mentioned that the expansion device 13 may be a valve such as a TXV or an EXV which regulates the amount of liquid refrigerant entering the evaporator 14 in response to the superheat condition of the refrigerant entering the compressor 11. It may also be a fixed orifice, such as a capillary tube or the like.

In accordance with the present invention, there are only two measured variables needed for assessing the charge level in either a TXV/EXV based air conditioning system or an orifice based air conditioning system. These measured variables are liquid line temperature $T_{liquid}$ and outdoor temperature $T_{outdoor}$ which are measured by sensors $S_1$ and $S_2$, respectively. These temperature sensors are thermocouples or the like, and the sensed temperatures are displayed in a manner to be described hereinafter. When the outdoor temperature $T_{outdoor}$ is subtracted from the liquid line temperature $T_{liquid}$, a parameter which we shall call the condenser approach temperature difference, or $T_{CATD}$, will be obtained. This value is an indication of the sufficiency of charge in the system.

Figure 2:
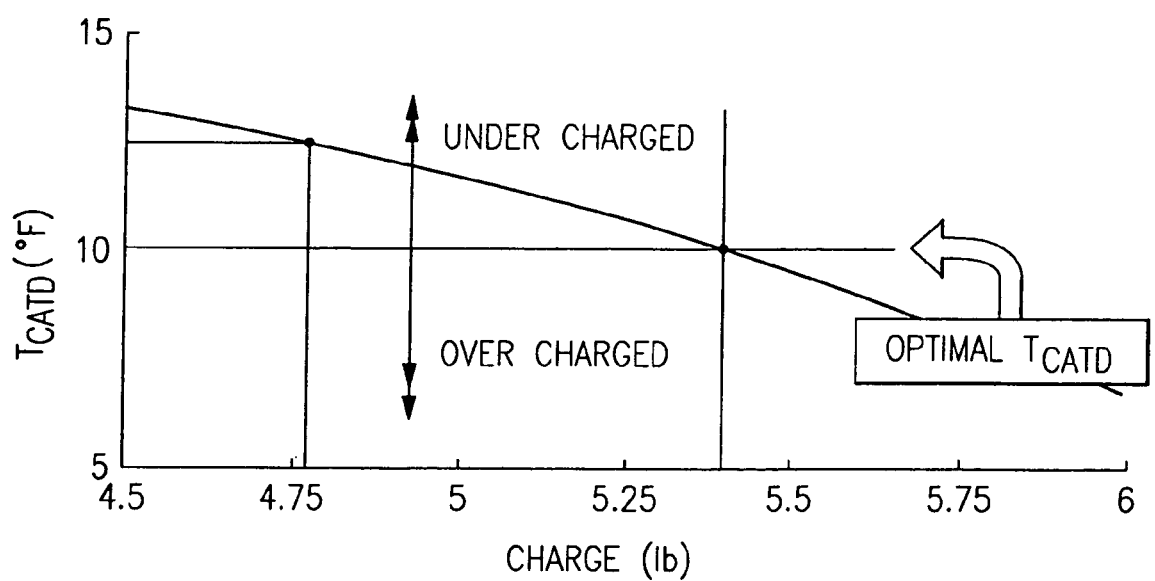
FIG. 2 is a graphic illustration of the relationship between refrigerant charge and the condenser approach temperature difference $T_{CATD}$ in a system.

Referring now to FIG. 2, there is shown a graphic illustration of the relationship between refrigerant charge as shown on the abscissa and the $T_{CATD}$ as shown on the ordinate for a given air conditioning system design. Generally, as the charged is increased, the $T_{CATD}$ is decreased. For the particular system illustrated, it has been determined that the optimal $T_{CATD}$ is 10° F. with a corresponding optimal refrigerant charge of 5.4 pounds of refrigerant. Thus, during steady state operations, if the $T_{CATD}$ is found to be greater than 10° F., the system is undercharged and if the $T_{CATD}$ is less than 10° F., the system is overcharged. In either case, the charge needs to be modified in order to achieve the optimum operating conditions. The optimal $T_{CATD}$ will be dependent upon the system capacity and efficiency rating.

Having identified the optimal $T_{CATD}$ for a particular system, it is then desirable to provide a simple and effective visual indication of the actual $T_{CATD}$ of the system such that an operator or technician can quickly and easily determine whether the system has the optimal refrigerant charge. This is accomplished by using two thermochromic liquid crystal temperature strips with one being attached to the liquid line and the other being installed in the system so at to measure the outdoor temperature. Each strip has a plurality of display elements or crystals responsive to a range of temperatures with the sensed temperature being indicated or displayed by showing as a different color from the remaining display elements. These crystals have the ability to selectively reflect light, and the color of the reflective light can be made to change as the temperature changes. The normal color change sequence is from red to green to blue (through the visible spectrum) with increasing temperature within the color reflected temperature range. Because of their unique temperature sensitive properties, these materials are also called thermochromic liquid crystals (TLCs). The rate of change from one reflective color to another, as well as the specific temperatures at which certain color changes occur, can also be accurately controlled. For a given temperature event, a green color shows the exact temperature, a blue color shows the actual temperature is higher than indicated, and a tan/brown color shows the actual temperature is lower than indicated. If two consecutive events show colors simultaneously (e.g. one blue, the lower temperature of the two and the other tan), the correct temperature is between the two.

Figure 3:
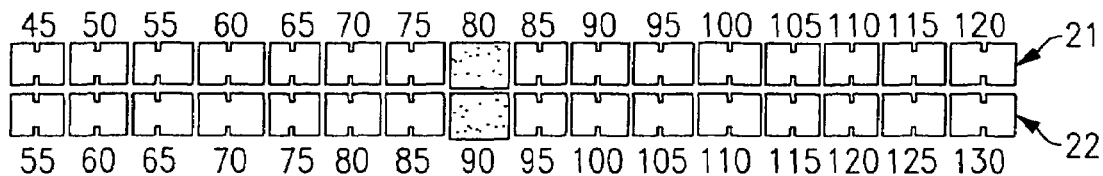
FIG. 3 is a front view of a pair of thermochromic strips as installed in accordance with the present invention.

As shown in FIG. 3, the two thermochromic liquid crystal temperature strips 21 and 22 are selectively placed in juxtaposition and respectively calibrated so that for a given outdoor temperature, the associated line temperature that aligns with it, will produce the optimal $T_{CATD}$. The top thermochromic strip 21 shows the outdoor temperature, whereas the bottom strip 22 indicates the line temperature. The difference in alignment between the two temperatures indicates $T_{CATD}$. If the line temperature as indicated by the strip 22 is above (i.e. to the right of) the outdoor temperature in alignment, then the user must add charge to the system. Charge must be added to the system until the top and bottom strip indications are vertically aligned, indicating that the optimal $T_{CATD}$ is achieved for that outdoor temperature.

The two strips 21 and 22 must be attached to an assembly that allows the outdoor temperature strip 21 to measure the air temperature and the liquid line strip 22 to make thermal contact with the liquid line. The assembly that holds both strips must be designed to thermally isolate the two strips so that there is little error in the measurement. The interface between the thermochromic strips 22 should be such that there is good thermal contact between the tube and the thermochromic strip 22. One way to achieve this is use a suitable conductive adhesive. In addition, a flat surface can be created in the tube to ensure uniform contact between the thermochromic strip 22 and the tube surface.

The present method significantly reduces the need for the user to use judgment in determining whether there is proper charge in the system. Essentially, the user is only required to charge until the indications are aligned. This will reduce the mistakes by installers and improve the installation quality for air conditioning systems. Once installed, the unit may act as a leak indication. If the temperature difference varies for more than two segments, for example the homeowner may be instructed to call a service technician since there may be a problem with the system.

In addition to the condenser approach temperature difference or $T_{CATD}$ method as described hereinabove, the method and apparatus for using a pair of thermochromic strips can also be used to determine the adequacy of the charge in an air conditioning system by estimating the degree of subcooling using other parameters. Such a method is described in U.S. patent application Ser. No. 11/025,787 filed concurrently herewith and incorporated herein by reference. With this approach, the liquid line temperature is sensed and displayed in the same manner as described hereinabove. However, rather than the outdoor temperature being sensed, the condenser coil temperature is sensed. The difference between the condensing line temperature and condenser coil temperature, denoted as coil temperature difference $T_{CTD}$ is used to derive the adequacy of the charge level in an air conditioning system.

Figure 4:
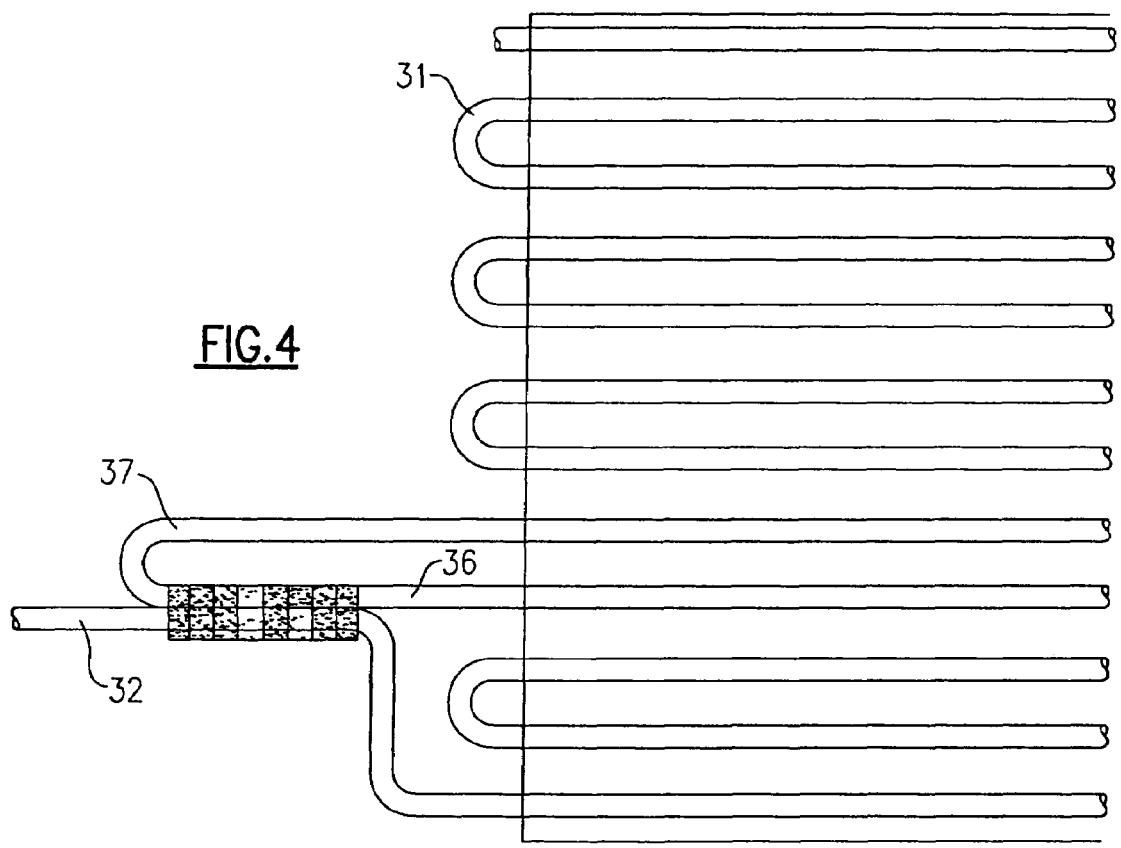
FIG. 4 is a schematic illustration of a temperature sensing arrangement in accordance with an alternative embodiment of the invention.
Figure 5:
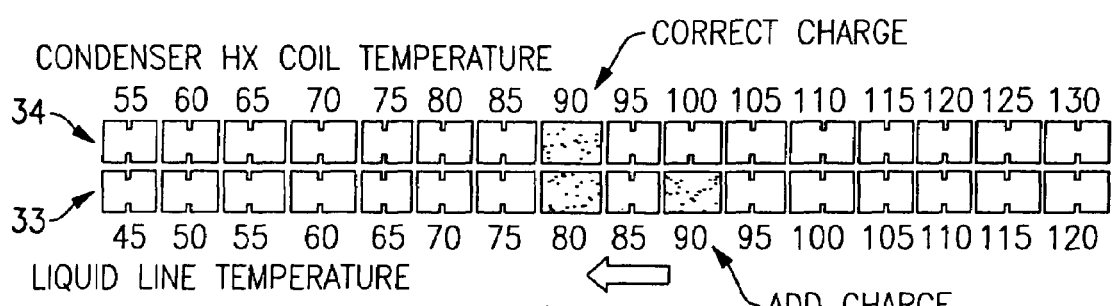
FIG. 5 is a front view of a pair of thermochromic strips as installed in accordance with an alternative embodiment of the invention.

Referring now to FIG. 4, there is shown a suggested arrangement of the thermochromic strips in relation to the condenser coil 31 so as to obtain an indication of refrigerant charge adequacy as a function of the $T_{CTD}$. As will be seen, the condenser coil 31 has been modified to have an extended U-bend 37 and the liquid line 32 has a thermochromic strip 33 basically applied thereto such that its temperature is sensed and displayed on the thermochromic strip 33. Similarly, the thermochromic strip 34 is physically attached to the condenser coil tube 36 in such an intimate manner that the temperature of the condenser coil 31 is sensed and indicated on the thermochromic strip 34. Again, as shown in FIG. 5 the two thermochromic strips 33 and 34 are located adjacent to each other and calibrated such that the difference between them is equal to the recommended subcooling for that particular system. In the same manner as described hereinabove, a vertical alignment of the two indicators will indicate an optimum charge, while a non-vertical alignment will indicate an improper charge level. For example, if strip 34 indicates a 90° F. measurement, and the strip 34 indicates a 90° F. measurement, than the installer will need to charge the system until the two illuminated segments are vertically orientated.

Figure 6:
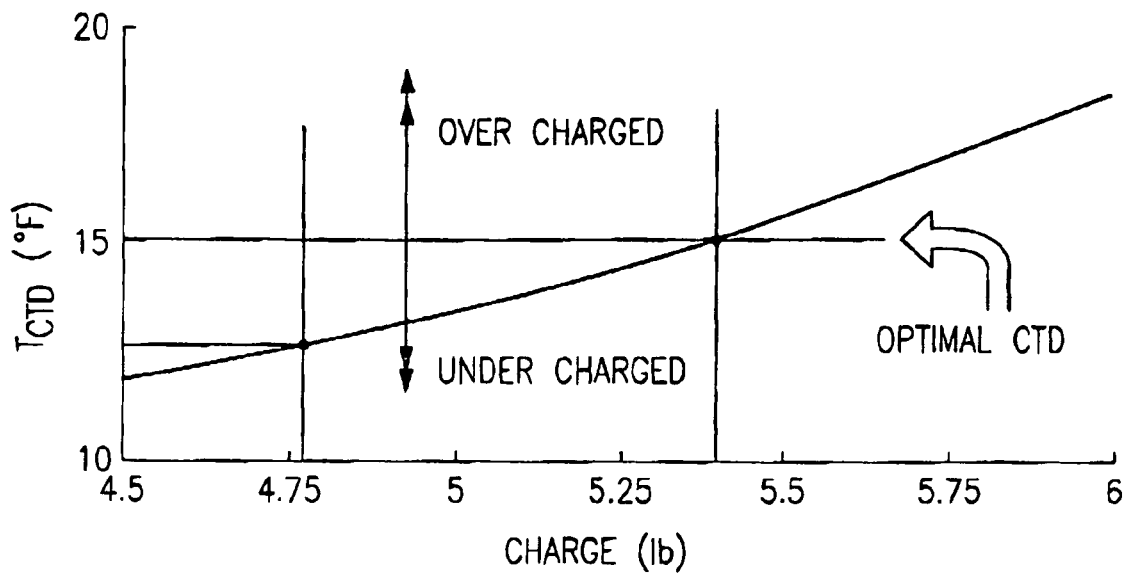
FIG. 6 is a graphic illustration of the relationship between refrigerant charge and the coil temperature difference $T_{CTD}$ in a system.

In FIG. 6, a graphic illustration is again shown of the relationship between the charge in the system and the sensed temperature $T_{CTD}$. For the particular system, the optimal $T_{CTD}$ is equal to 15° F. and any sensed $T_{CTD}$ less than 15° F. will indicate that the system is undercharged and needs to have refrigerant added to the system.

Figure 7A:
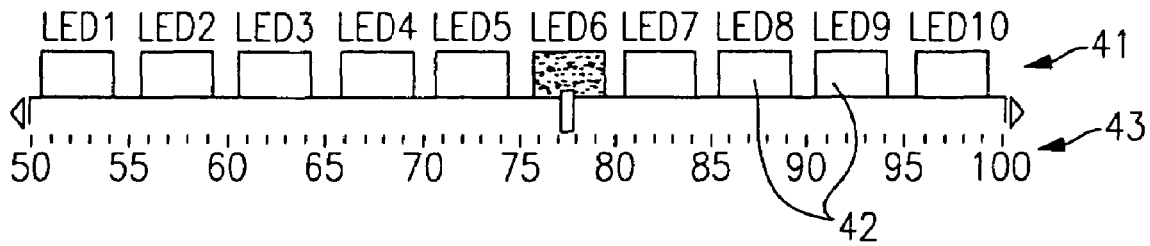
FIGS. 7A-C are schematic illustrations of charge indicator displays in accordance with a further alternative embodiment of the invention.
Figure 7B:
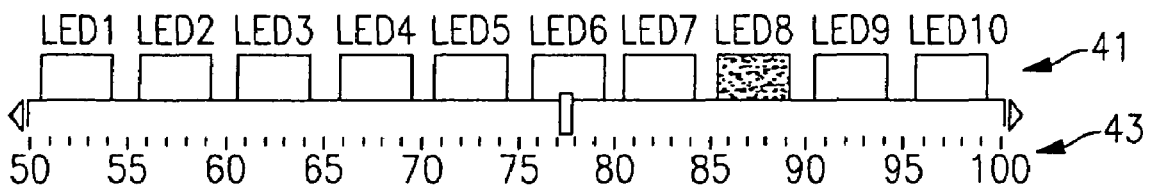
Figure 7C:
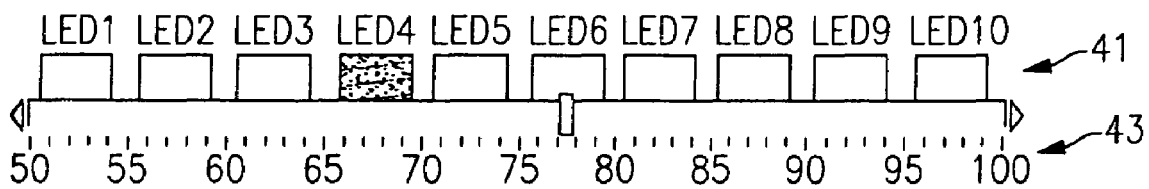

Rather than the thermochromatic strips being used as the sensed temperature indicators, another approach of displaying the respective sensed temperatures is shown in FIGS. 7A-7C. Here, a panel 41 of LEDs 42 is provided to indicate the liquid line temperature as measured using a temperature sensor such as a thermistor or thermocouple. The sensor converts the temperature of the liquid line into a voltage signal, which is applied to the input terminal of the charge indicator as will be described more fully hereinafter. Each of the LEDs 42 is representative of a particular segment of the range of temperatures which may be sensed at the liquid line.

Below the LED array 41 is a temperature scale 43 used to indicate the outdoor temperature. A slider over the scale 43 can be manually moved in either horizontal direction within the range of the scale. This temperature scale which is so calibrated and selectively disposed adjacent the panel 41 of LEDs 42 as to provide, in combination, an indication of the charge condition of the system is used as a non-electrical memory device to store outdoor ambient temperatures. Service personal can use a commercially available thermometer to measure the outdoor temperature, and then retain this measurement by moving the slider to the corresponding position on the scale as the same value as the measured outdoor temperature. Alternatively, connection to an outdoor temperature sensor may be provided for systems which have such a sensor. After the measurement of outdoor temperature, service personal can use the device to assist in charging the system. With the unit being properly charged the LED above the slider should be turned on and glow brightly in a predefined color, as shown in FIG. 7A.

If the unit is undercharged, any of the LEDs to the right of the slider may be turned on as shown in FIG. 7B. The position relative to the slider will determine the degree of undercharge, such that the lower the charge, the further away the lighted LED will be from the slider.

If the system is overcharged, on the other hand, the LED that is lighted will be to the left of the slider as shown in FIG. 7C. Again, the level of overcharge determines how far away the lighted LED is from the slider.

Figure 8:
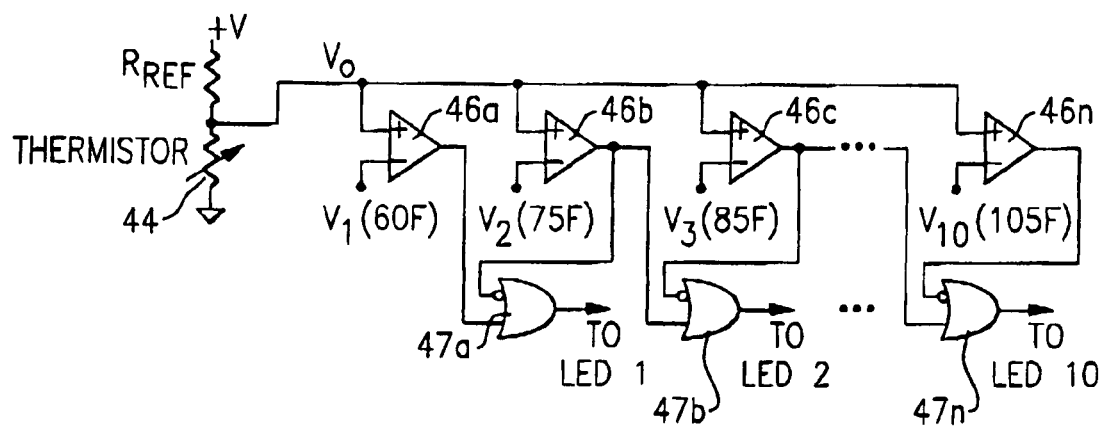
FIG. 8 is a circuit diagram for driving the LEDs for the alternative embodiment of the invention.

Shown in FIG. 8 is a circuit diagram indicating how the charge indicator of FIG. 7A-7C is electronically implemented. The condenser liquid line temperature is measured using a thermistor 44 that converts temperature into a voltage signal. A reference resistor $R_{REF}$ with a known value is connected in series with a DC power supply, +V, and thermistor 44. The voltage of the DC power supply and the value of the reference resistor can be determined depending on the range of the temperatures of interest. The voltage of the reference resistor $R_{REF}$ is indicative of the temperature of the condenser liquid line. This voltage is applied to the input terminal of the LED drive circuit as shown. The LED drive circuit is composed of series of comparators 46a thru 46n and AND gates 47a thru 47n. The reference voltage of the comparator 46a is determined from the predefined temperature threshold. The AND gates 47 are used to disable the remaining LEDs from being turned on once one of them has been turned on. The small circles at the input of the AND gates 47 represent that the input logic is reversed. Depending on the requirement, the resolution between the reference voltages is determined by the corresponding temperature resolution that the LEDs are required to represent. By experimentation, we have found that a 5° F. resolution is sufficient for most applications.

As an example, suppose the value for the DC supply, or +V, is 24V, the voltage ($V_O$) applied to the comparators can be calculated as:

$$V_o = 24 \times \frac{R}{R + R_{REF}}$$

where R is the resistance value of the thermister 44, which changes in accordance with temperature. For a specific thermister selected, there is a unique relationship (curve) between the temperature and the resistance value. With the $R_{REF}$ given and the resistance values of the thermister known as corresponding to different temperatures, the voltage $V_0$ applied to comparators 46 can be obtained at those temperature values.

The thresholds of the comparators 46 accordingly are set to the voltage values that are corresponding to temperature values (60 F, 75 F etc.). The threshold voltages can be provide by dividing the same voltage source supplied to the thermister 44. The commonly used resistance based voltage dividers, known to those familiar to the art of electronics can be used. The AND gates are used in the present invention to ensure that only one LED is turned on at one time. A variation of the present invention is the multiple LEDs ca be turned on, if necessary. For example, if the AND gates 47 are not used and the temperature reaches 85 F, all the LEDs for temperatures below 85° F. would be turned on.

The temperature scale 43 shown in FIG. 7A-7C is shown as being linearly designated. In practice, non-linear scales such as a logarithmic scale may also be used. This may be advantageous in view of the fact that the temperature difference between the liquid line temperature and the outdoor temperature may change non-linearly depending on the outdoor temperature. A procedure for marking the outdoor temperature scale 43 in a non-linear fashion may be carried out as follows.

As a first step the temperatures represented by the LEDs 42 are determined. For example if an array of LEDs is required to indicate the liquid line temperature range from 80° F. to 120° F., with a resolution of 5° F., then eight LEDs are required. In the second step, at each liquid line temperature value, the outdoor temperature is determined from existing test data. This is accomplished by reversal of the usual logic concerning liquid line temperature. That is, in the usual manner, if we know outdoor temperature and the capacity of the unit, we can determine the specific liquid line temperature that is representative of a properly charged unit. In reversing this logic, given the liquid line temperature represented by a particular LED, the required outdoor temperature can be determined and marked on the scale 43. This step two is repeated until the outdoor temperatures for all liquid line temperatures represented by the LEDs are properly marked.

While the present invention has been particularly shown and described with reference to preferred and alternate embodiments as illustrated in the drawings, it will be understood by one skilled in the art that various changes in detail may be effected therein without departing from the true spirit and scope of the invention as defined by the claims.

We claim:

1. A method of determining the sufficiency of refrigerant charge in a refrigeration system having a compressor, a condenser, an expansion device and an evaporator fluidly connected in serial refrigerant flow relationship comprising the steps of:
    sensing the temperature of the liquid refrigerant leaving the condenser;
    sensing the outdoor temperature; and
    visually, simultaneously displaying by way of positional indications on respective thermochromic strips, both said sensed liquid refrigerant temperature and said sensed outdoor temperature such that the relative positions of the positional indications are indicative of refrigerant charge sufficiency in the system.

2. A method as set forth in claim 1 wherein each of said thermochromic strips displays a range of temperatures with the sensed temperature display being indicated by a different color.

3. A method as set forth in claim 1 wherein said thermochromic strips are adjacently juxtaposed and calibrated such that a misalignment of the sensed temperature displays will indicate that the system is improperly charged.

4. A method as set forth in claim 1 wherein said thermochromic strips are selectively calibrated and juxtaposed such that when the system charge is optimized, the sensed temperature displays will be aligned.

5. A method as set forth in claim 1 and including the step of calibrating the displays to show the difference between said sensed outdoor temperature and said sensed liquid refrigerant temperature.

6. A method as set forth in claim 5 and including the further step of comparing said difference with a predetermined optimal temperature difference for the particular system.

7. Apparatus for indicating the sufficiency of refrigerant charge in a refrigeration system having a compressor, a condenser, an expansion device and an evaporator fluidly connected in serial refrigerant flow relationship comprising:
    a first sensor for sensing the temperature of the liquid refrigerant leaving the condenser;
    a second sensor for sensing the outdoor temperature;
    a first visual display to provide a first visual indication of the sensed liquid refrigerant temperature; and
    a second visual display to provide, simultaneously with said first visual indication, a second visual indication of the outdoor temperature;
    wherein at least one of said first and second visual displays is by way of a thermochromic strip and the relative positions of the respective first and second visual indications are indicative of the charge sufficiency in the system.

8. Apparatus as set forth in claim 7 wherein both of said first and second visual displays are by way of thermochromic strips.

9. Apparatus as set forth in claim 7 wherein at least one of said visual displays represents a range of temperatures with the sensed temperature indicator being of a different color.

10. Apparatus as set forth in claim 7 wherein first and second visual displays are selectively juxtaposed and calibrated, such that a misalignment of the temperature indicators will indicate that the system is improperly charged.

11. Apparatus as set forth in claim 7 wherein displays are selectively calibrated and juxtaposed such that when the system charge is optimized, the temperature indicators will be aligned.

12. Apparatus as set forth in claim 7 wherein said first and second displays are so juxtaposed and calibrated as to collectively show the difference between said sensed outdoor temperature and said sensed liquid refrigerant temperature.

* * * * *